United States Patent [19]

Stahlecker

[11] Patent Number: 5,349,809
[45] Date of Patent: Sep. 27, 1994

[54] SHAFT FOR AN OPEN-END SPINNING ROTOR ASSEMBLY

[75] Inventor: Fritz Stahlecker, Bad Überkingen, Fed. Rep. of Germany

[73] Assignee: Stahlecker: Hans, Fed. Rep. of Germany

[21] Appl. No.: 102,804

[22] Filed: Aug. 6, 1993

Related U.S. Application Data

[63] Continuation-in-part of Ser. No. 846,694, Mar. 6, 1992, abandoned.

[30] Foreign Application Priority Data

May 25, 1991 [DE] Fed. Rep. of Germany ....... 4117175

[51] Int. Cl.$^5$ ............................................. D01H 4/12
[52] U.S. Cl. ........................................ 57/406; 384/610
[58] Field of Search .................. 57/404, 406, 407, 414; 384/420, 425, 610

[56] References Cited

U.S. PATENT DOCUMENTS

| | | | |
|---|---|---|---|
| 405,559 | 6/1889 | Johansson | 384/610 X |
| 867,426 | 10/1907 | Shields | 384/610 X |
| 931,069 | 8/1909 | Larrabee | 384/610 |
| 3,805,506 | 4/1974 | Stahlecker | 57/406 X |
| 3,951,479 | 4/1976 | Stahlecker | 384/610 |
| 4,713,932 | 12/1987 | Zott | 57/406 |
| 4,763,465 | 8/1988 | Raasch | 57/406 X |
| 4,763,469 | 8/1988 | Stahlecker et al. | 57/406 X |
| 4,916,891 | 4/1990 | Landwehrkamp et al. | 57/406 |

FOREIGN PATENT DOCUMENTS 1901453 8/1970 Fed. Rep. of Germany .
2716573 10/1978 Fed. Rep. of Germany .

Primary Examiner—Joseph J. Hail, III
Attorney, Agent, or Firm—Evenson, McKeown, Edwards & Lenahan

[57] ABSTRACT

A rotor support shaft for an open-end spinning rotor assembly is disclosed which is equipped on its free end with a supporting element which forms an essentially radially extending supporting surface for a vibrating ball of a step bearing. The supporting element is made of a material, preferably for a ceramic material, which has a higher hardness than steel. The supporting element is arranged in a receiving device concentric with respect to the axis of the shaft in such a manner that the supporting surface projects slightly from the front face of the shaft.

14 Claims, 3 Drawing Sheets

SHAFT FOR AN OPEN-END SPINNING ROTOR ASSEMBLY

This is a continuation-in-part Application of pending prior U.S. application Ser. No. 07/846,694, filed Mar. 6, 1992, of Fritz Stahlecker entitled A SHAFT FOR AN OPEN-END SPINNING ROTOR ASSEMBLY, now abandoned.

BACKGROUND AND SUMMARY OF THE INVENTION

This invention relates to a shaft for an open-end spinning rotor, the free end of which is equipped with a supporting element which forms an essentially radially extending supporting surface for a vibrating ball of a step bearing.

It is known (German Patent Document DE 27 16 573 A1) to support the shaft of an open-end spinning rotor in the axial direction on a ball of a step bearing which is held in such a manner that it is caused to carry out vibrations of low amplitudes and of a high frequency. The free end of the shaft is equipped with a lengthening which has a reduced diameter and is used as a supporting element abutting the ball of the step bearing. The low amplitude vibrations have the result that the position of the shaft and therefore of the opened spinning rotor does not change noticeably. In addition, the vibrations have the result that the ball is supported on continuously changing supporting points on the supporting surface of the shaft and on an opposite abutment so that the ball carries out rotational movements. Since the ball is wetted with lubricant, a low-wear bearing is obtained despite the high rotational speeds which today are at 100,000 min$^{-1}$ (revolutions per minute) and higher.

The open-end spinning rotor is a wearing part that has to be exchanged after an extensive operating time. As a result of improvements of the rotor and particularly by applying comings to the rotor, it has been achieved that a relatively long life was obtained for the rotor. The relatively long life of the rotor has the result that today different wear phenomena become noticeable on the open-end spinning rotor assembly and influence the overall life time. When the life time of the rotor and therefore the running time is increased and, in addition, the rotational speeds of the rotor are extremely high, it is found that the vibrations of the ball of the step bearing result in a deformation of the supporting element in the area of its supporting surface so that over time the supporting element is axially shortened. This shortening takes place before the rotor exhibits such manifestations of wear that an exchange of the open-end spinning rotor is necessary. These shortenings of the supporting element have the result that the rotor changes its position in the spinning arrangement to an unacceptable extent. Actually, it would easily be possible to compensate this change of position by an axial readjusting of the abutment of the step bearing ball. However, this is not very useful in the case of machines used in practice because these machines have two hundred and more spinning positions, and because the open-end spinning rotor assemblies are to be exchangeable with respect to one another.

In order to solve this problem of the shortening of the shaft of the open-end spinning rotor, it was suggested in a German Patent Application (P 40 20 411.1), which is no prior publication, to arrange an exchangeable supporting element on the free end of the shaft which forms an exchangeable wearing part. This exchangeable element is arranged in a centric bore of the shaft so that an exchange does not have the result that the open-end spinning rotor assembly must be newly adjusted. The supporting element, which is used as the wearing part, projects out of the free end of the shaft in such a manner that a tool can be applied for the pulling-off of this supporting element.

For the solution of the problem, it was suggested in another German Patent Application (P 40 37 833.0), which is no prior publication, to mount a supporting element in the form of a small plate on the free end of the shaft, in which case a damping layer may be provided between the supporting element and the shaft.

In the case of another type of bearing of an open-end spinning rotor assembly, it is known (German Patent Document DE 19 01 453 A1) to support the free end of the shaft against a step plate which is held in a receiving plate made of an elastic material so that the transmission of vibrations is prevented. In the case of this construction, it is known to arrange at the free end of the shaft a particularly hard supporting device which may be made, for example, of a hard metal, of a diamond or of a ceramic material. This supporting device is to be fastened to the shaft in a fixed manner, for example, by means of a press fit or by crimping, or in an exchangeable manner. The supporting device has a hemispherical shape so that it is supported on the step plate approximately in a punctiform manner.

It is an object of the invention to develop a shaft of the initially mentioned type in such a manner that a deforming in the area of the supporting surface of the supporting element is reduced significantly so that the supporting element, despite very high rotational rotor speeds, is not the reason why the open-end spinning rotor assembly becomes unserviceable.

This and other objects are achieved by the present invention which provides a shaft assembly for an open-end spinning rotor comprising a shaft having a first end supporting a rotor and an opposite second face end that has a diameter reduced relative to the shaft approximately 0.6 times. The assembly includes a receiving device at the free end of the shaft, and a substantially cylindrical ceramic supporting element pressed into the receiving device. The supporting element has a supporting surface projecting slightly out of the receiving device of the shaft in the axial direction. The supporting surface and the supporting element have diameters that correspond to approximately half of a radius of a vibrating bell to which the supporting surface is applicable. The supporting surface has rounded edges with a radius approximately 1/10 of the diameter of the supporting element.

By means of the development according to the invention, it is important to use a supporting element that is made of materials of a very high hardness although, in comparison to steel, these materials are relatively brittle and therefore sensitive to impacts. A destruction of such a supporting element is probably prevented by the fact that this supporting element is laterally bordered by the shaft, particularly near the area of its supporting surface. In this case, the centric mounting of this supporting element has the advantage that the supporting element cannot result in any significant unbalanced mass even if its specific weight deviates significantly from the specific weight of the shaft which is made of a steel type. The balancing of the open-end spinning rotor assembly is therefore not made more difficult by such a supporting element.

In a further development of the invention, it is provided that the supporting element and the receiving device each have a cylindrical shape. In a particularly simple manner, this results in a precisely centric arrangement. It is also advantageous in this case that, in a further development of the invention, the axial length of the supporting element corresponds to approximately 2 to 3 times its diameter. As a result, a secure centric position is achieved. A secure protection against a breaking-out of the material of the supporting element in the edge areas is obtained when, in a further development of the invention, the outside diameter of the shaft in the area of the receiving device corresponds to approximately twice the diameter of the receiving device.

In a further development of the invention, it is provided that the supporting element is held in the receiving device in a ring-shaped manner in the axial direction on its end facing away from the supporting surface. Probably this measure also promotes the fact that the supporting element which is brittle per se is not destroyed by the vibrating ball of the step bearing since the supporting element is free for the most part in the axial direction on the side situated opposite the supporting surface so that it can vibrate or swing in the axial direction.

In an advantageous development of the invention, it is provided that the supporting element is made of a ceramic material. Although such ceramic materials and particularly oxide ceramic materials are very brittle and have only a relatively low resistance to impact, supporting elements made of such a material have exhibited particularly good results in tests with respect to their resistance to wear.

Other objects, advantages and novel features of the present invention will become apparent from the following detailed description of the invention when considered in conjunction with the accompanying drawings.

DETAILED DESCRIPTION OF THE DRAWINGS

Figure 1:
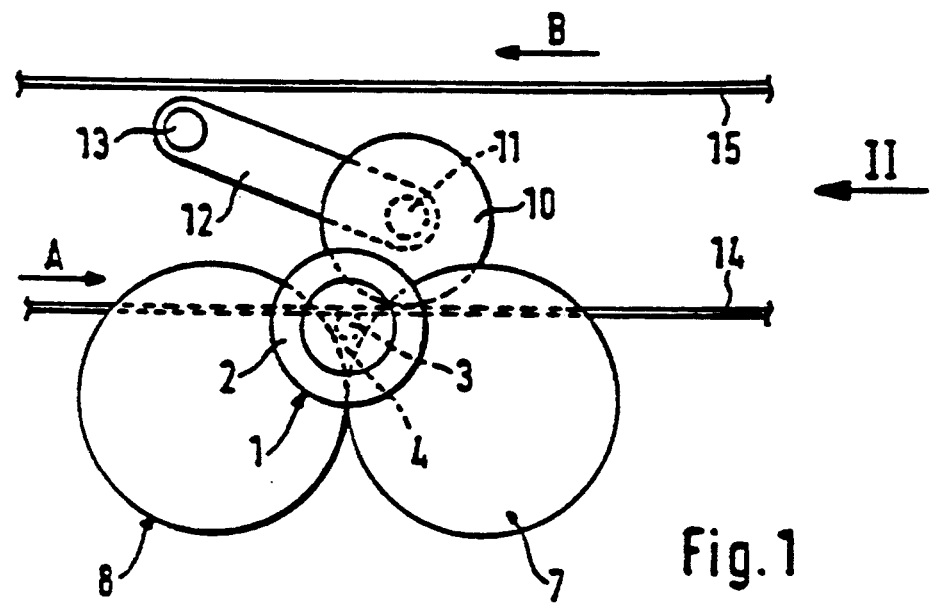
FIG. 1 is a schematic representation of a frontal view of a supporting disk bearing arrangement for an open-end spinning rotor assembly.
Figure 2:
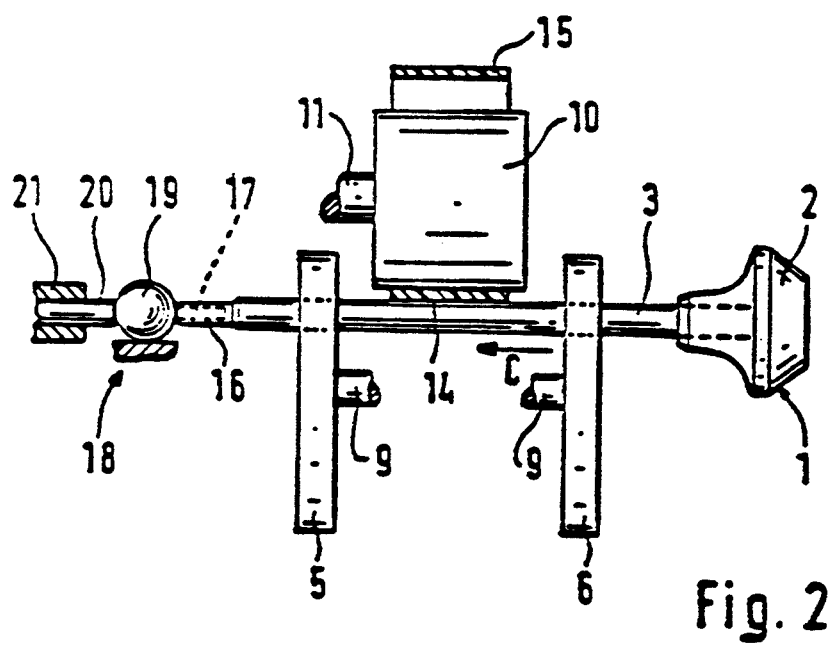
FIG. 2 is a view in the direction of the arrow II of FIG. 1 with a shaft provided with a supporting element in a receiving device according to the invention.

The supporting disk arrangement for an open-end spinning rotor 1 illustrated in FIGS. 1 and 2 is a component of an open-end spinning unit. It comprises a total of four supporting disks 5, 6 which, as supporting disk pairs 7, 8, are each disposed on a common shaft 9. In a manner not shown in detail, the shafts 9 are disposed in bearing housings by means of roller bearings. The supporting disk pairs 7, 8 are arranged such that they form a wedge-shaped gap 4 in which the shaft 3 of an open-end spinning rotor assembly 1 is disposed in the radial direction. On one of its ends, the shaft 3 carries a rotor 2 in which the yarn formation takes place in the known manner.

The shaft 3 is driven by means of a tangential belt 14 which moves against the shaft 3 between the supporting disks 5, 6 and holds the shaft 3 in the wedge-shaped gaps 4. The tangential belt 14 is loaded by means of a contact pressure roller 10 in the proximity of the shaft 3. The contact pressure roller 10 is freely rotatably about a shaft 11 disposed in a swivel arm 12 which, in a manner not shown in detail, is loaded by means of a contact pressure spring and which can be swivelled about a swivel shaft 13 extending transversely with respect to the tangential belt 14. As illustrated in FIG. 1, the returning end or run 15 of the tangential belt 14 running in the direction of the arrow (A) is guided back above the contact pressure roller 10 in the direction of the arrow (B).

The shafts 9 of the supporting disk pairs 7, 8 are aligned in a known manner by a slight angle askew with respect to one another in such a manner that in connection with the travelling direction (A) of the tangential belt 14, by means of the rolling-off of the shaft 3 on the supporting disks 5, 6, an axial thrust is generated in the direction of the arrow (C) which loads the shaft 3 with its free end 16 in the direction of the step bearing 18. The step bearing 18 comprises a ball 19 which is continuously excited by machine vibrations to perform vibrations and which is held on the side opposite the shaft 3 by means of an abutment 20 which is adjustably arranged in a housing part 21. The end 16 of the shaft 3 is provided with a supporting element 17 constructed as an insert, as will be explained in detail in the following. Because of machine vibrations, the ball 19 is caused to perform vibrations of low amplitudes and high frequency, in which case a rotation of the ball 19 takes place about several axes because of varying supporting points. In a manner not shown in detail, the ball 19 is continuously wetted with a lubricant.

Figure 3:
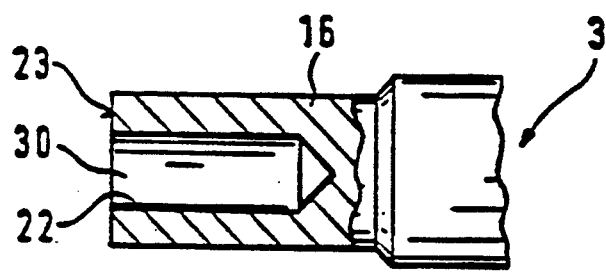
FIG. 3 is an enlarged, partially sectional view of the area of the free end of a shaft according to the invention without any supporting element.

As illustrated in FIG. 3, the free end 16 of the shaft 3 which has a diameter which is reduced with respect to the other part, is provided with a receiving device 30 which extends centrically with respect to the shaft axis and which starts on the front face 23 and forms a cylindrical interior wall 22 which tapers off to a point. The outside diameter of the free end 16 corresponds approximately to twice the inside diameter of the receiving device 30. The axial length of the cylindrical part of the receiving device 30 corresponds approximately to 2.5 times the inside diameter of the receiving device 30.

Figure 5:
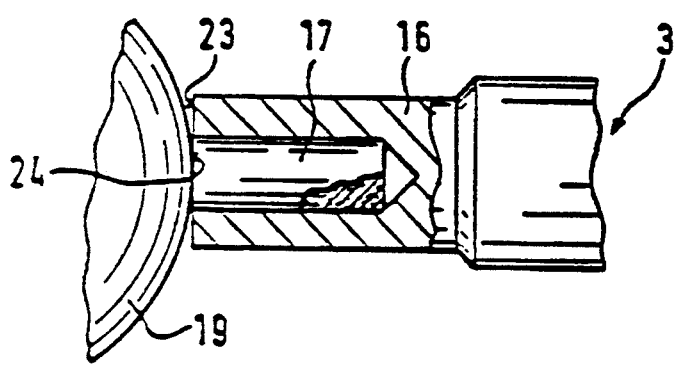
Figure 6:
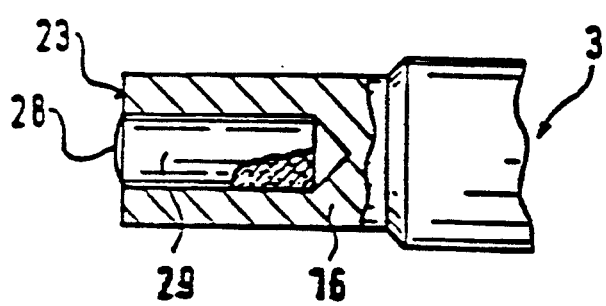
Figure 7:
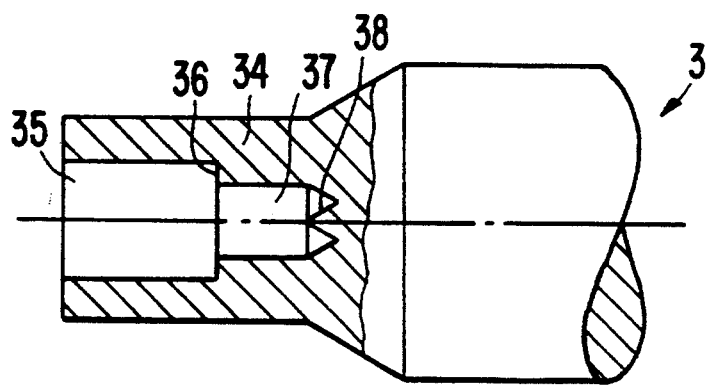
FIG. 7 is a view of another embodiment of the receiving device of the free end of the shaft.
Figure 8:
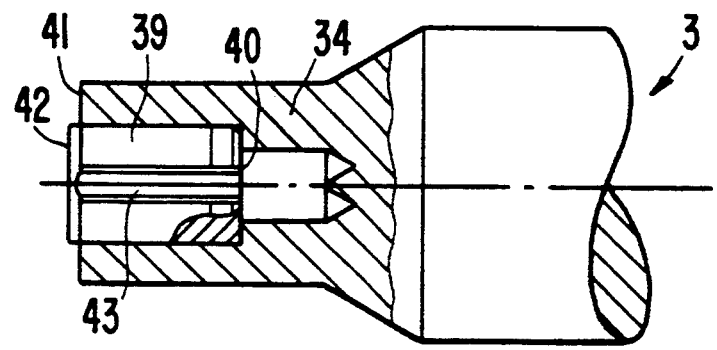
FIG. 8 is a view of the receiving device of FIG. 7 with an inserted supporting element constructed according to an embodiment of the present invention.
Figure 9:
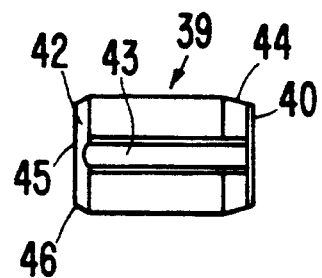
FIG. 9 shows a side view of the supporting element of FIG. 8 in isolation.
Figure 10:
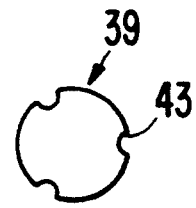
FIG. 10 is an end view of the supporting element of FIG. 9.

As illustrated in FIGS. 5 and 6, a supporting element 17 according to FIG. 5 or a supporting element 29 according to FIG. 6 is inserted into the receiving device 30 This supporting element 17 or 29 is made of a material of a hardness that is very high in comparison to steel, particularly of an oxide ceramic material, such as fused corundum. The axial length of the pin-shaped supporting element 17, 29 corresponds to the axial length of the cylindrical section of the receiving device 30; that is, the axial length of the supporting element 17 and 29 corresponds to approximately 2.5 times its outer diameter. As shown in FIG. 5, the ball 19 has a radius which corresponds to approximately twice the diameter of the supporting element 17.

In the embodiment according to FIG. 5, the supporting element 17 has a plane supporting surface 24, which extends in a radial plane and against which the ball 19 comes to a rest. The supporting surface 24 extends flush with respect to the front face 23 of the free end 16 of the shaft 3.

In the embodiment according to FIG. 6, it is provided that the supporting surface 28 of the supporting element 29 has a slightly spherical design which, with its edge, tapers out in the front face 23 of the free end 16 of the shaft 3. In both cases, the supporting element 17 and 29 is therefore bordered virtually along its whole axial length by the free end 16 of the shaft 3 made of a steel type.

By means of a line contact, the supporting element 17, 29 is supported in a ring-shaped manner on the tapering end area of the receiving device 30.

In a first embodiment, the supporting element 17 or 29, which is made of a ceramic material is pressed into the receiving device 30. In another embodiment, it is provided that the supporting element 17 or 29 is glued into the receiving device 30.

Figure 4:
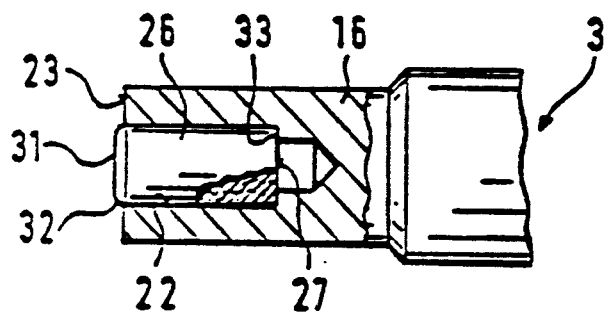
FIGS. 4 to 6 are views of different embodiments of the supporting elements and of the pertaining receiving device of the free end of the shaft.

In the embodiment according to FIG. 4, the receiving device is bounded by a ring shoulder 33; that is, the cylindrical section of the interior wall 22 of the free end 16 ends in a ring shoulder 33, while the receiving device 30 continues a little longer with a reduced diameter. The interior front face 27, which is opposite the supporting surface 31, of the supporting element 26 constructed as a cylindrical pin is therefore supported in the axial direction by the ring shoulder 33 in the area of its outer edge. The ring shoulder 33 has a slightly radial course which may be in the range of less than 1 mm. The supporting surface 31 of the supporting element 26 projects slightly beyond the front face 23 of the free end 16 of the shaft 3. This supporting surface 31 extends essentially in a radial plane and has a rounded edge area 32.

In a modified embodiment, instead of a convex supporting surface 28 according to FIG. 6, a concavely curved supporting surface for the supporting element is provided, in which case the bending radius of the concavely curved supporting surface will then clearly be larger than the radius of the ball 19 so that, in each case, there is only punctiform contact.

FIGS. 7–10 illustrate another embodiment of the invention in which the supporting element 39 projects slightly in the axial direction out of the shaft end 41 of the shaft 3. (As in the earlier described embodiments, this supporting element 39 may also be ceramic.) The projection may be between 0.1 mm to 0.4 mm, for example. As can best be seen in FIG. 8, the supporting surface 45 is not completely flat, but rather is slightly crowned. An exemplary radius for the crowned end is 7 to 15 times the diameter of the supporting element 39. The supporting element 39 has at its second end face 40 a bevel 44 which has an angle of approximately 5°. This relatively long bevel is preceded by a short, steeper bevel.

The edge 42 of the supporting surface 45 is rounded and thereby reduces the danger that the supporting surface 45 will be destroyed in the edge area. The radius 46 for the rounding of this edge 42 of the supporting surface is in the order of approximately 1/10 of the diameter of the supporting element 39.

Similar to the embodiment of FIG. 5, the ball 19 which is to be supported, in comparison to the supporting element 39, has a relatively large diameter. For example, the ball 19 may have a diameter of 12 mm (radius 6 mm), while the supporting element 39 has a diameter of approximately 2.7 mm. The end 34 of the shaft 3 is reduced with respect to the remaining area of the shaft 3 by approximately 0.6 times.

One of the problems associated with assembly of a shaft 3 and supporting element 39 is that the air contained in the bore 35 normally cannot escape easily so as to make pressing in more difficult. To solve this problem, the supporting element 39 is provided with uniformly distributed longitudinal grooves 43 through which air can escape during the pressing-in. The depth of the longitudinal grooves 43 is such that they do not extend into the lateral area of the rounded edge 42.

Another solution to the pressing in problem is provided by a step 46 in the bore 35. The supporting element 39, with its second end face 40, is pressed against the step (or "ring shoulder") 46. The air is collected in the remaining area of the bore 35 and is therefore compressed. The bore 35 can be made by a "deep hole drill" so that a conical projection 38 remains after drilling.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shaft assembly for an open-end spinning rotor comprising:
   a shaft having a first end supporting a rotor and an opposite second end;
   a receiving device at the second end of the shaft and
   a substantially cylindrical ceramic supporting element pressed into the receiving device, the supporting element having a supporting surface projecting slightly out of the receiving device of the shaft in the axial direction, the supporting surface having rounded edges, wherein the supporting element includes longitudinal grooves on a circumference of the supporting element.

2. A shaft assembly according to claim 1, wherein the supporting surface projects out of the receiving device by approximately 0.1 mm to 0.4 mm.

3. A shaft assembly according to claim 1, wherein the supporting element has a diameter of approximately 2.7 mm.

4. A shaft assembly according to claim 1, wherein the grooves have a length that extend up to a lateral area of a rounded edge of the supporting element so as to end before the supporting surface.

5. A shaft assembly according to claim 1, wherein the plurality of the longitudinal grooves are uniformly distributed around the circumference of the supporting element.

6. A shaft assembly according to claim 1, wherein the supporting surface is crowned.

7. A shaft assembly according to claim 6, wherein the supporting surface is crowned with a radius of 7 to 15 times the diameter of the supporting element.

8. A shaft assembly for an open-end spinning rotor comprising:
   a shaft having a first end supporting a rotor and an opposite second end;
   a receiving device at the second end of the shaft; and a substantially cylindrical ceramic supporting element pressed into the receiving device, the supporting element having a supporting surface projecting slightly out of the receiving device of the shaft in the axial direction, he supporting surface having rounded edges, wherein the receiving device includes a bore in the second end, the bore having a step with an axially facing surface and a chamber into which air is compressible upon pressing in of the supporting element.

9. A shaft assembly according to claim 8, wherein the bore has an end that includes at least one conical projection produced by deep hole drilling.

10. A shaft assembly according to claim 8, wherein the supporting surface projects out of the receiving device by approximately 0.1 mm to 0.4 mm.

11. A shaft assembly according to claim 8, wherein the supporting element has a diameter of approximately 2.7 mm.

12. A shaft assembly for an open-end spinning rotor comprising:

a shaft having a first end supporting a rotor and an opposite second end;

a receiving device at the second end of the shaft; and a substantially cylindrical ceramic supporting element pressed into the receiving device, the supporting element having a supporting surface projecting slightly out of the receiving device of the shaft in the axial direction, the supporting surface having rounded edges, wherein the supporting element includes an end opposite the supporting surface, said end having a first bevel with an angle of approximately 5°, and a second bevel following the first bevel to said end, the second bevel having an angle greater than 5 and being longer than the first bevel.

13. A shaft assembly according to claim 12, wherein the supporting surface projects out of the receiving device by approximately 0.1 mm to 0.4 mm.

14. A shaft assembly according to claim 12, wherein the supporting element has a diameter of approximately 2.7 mm.

* * * * *